Nov. 6, 1934.  I. L. TENNEY  1,979,355
WINDING MECHANISM
Filed Feb. 1, 1932  3 Sheets-Sheet 3
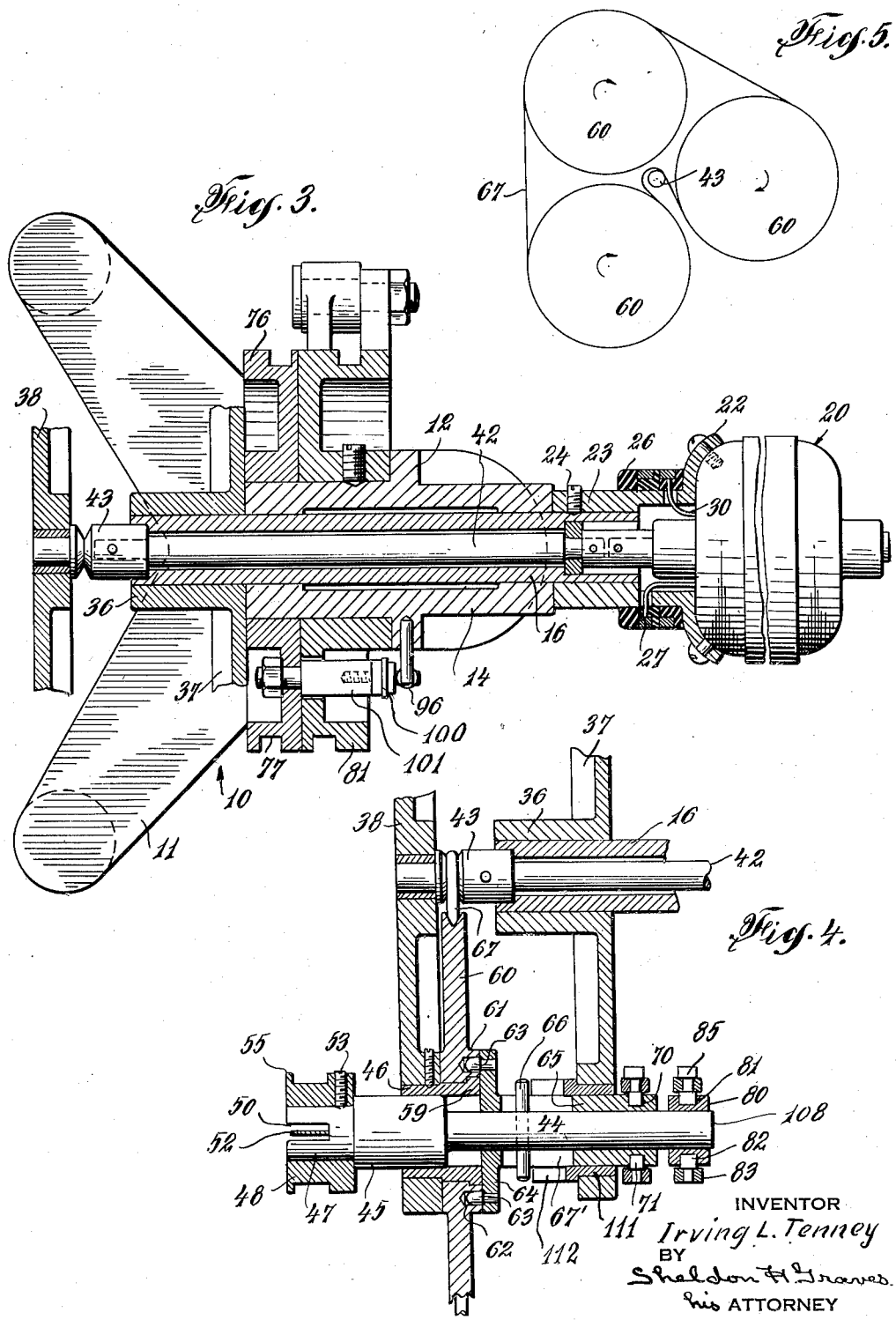

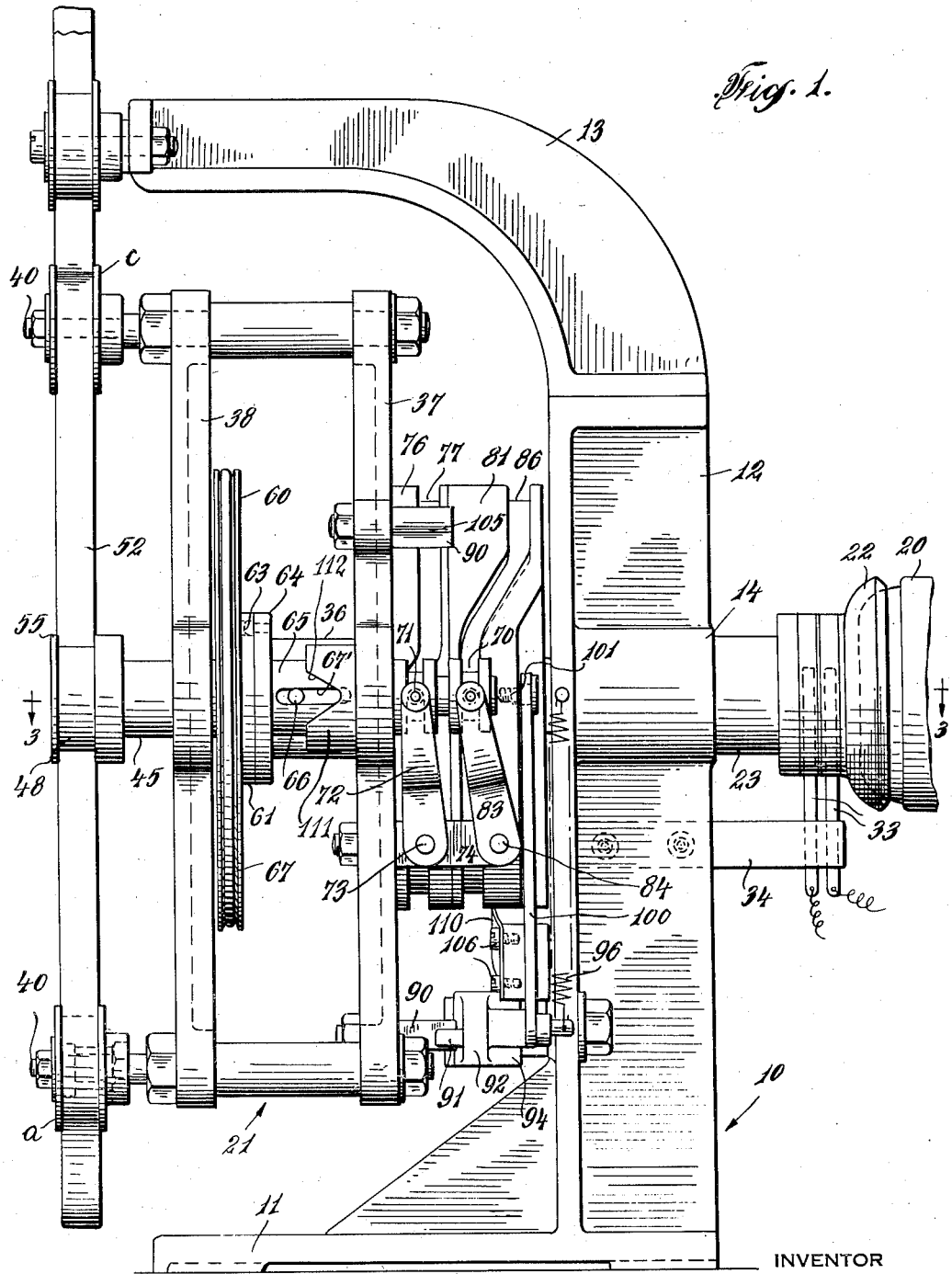

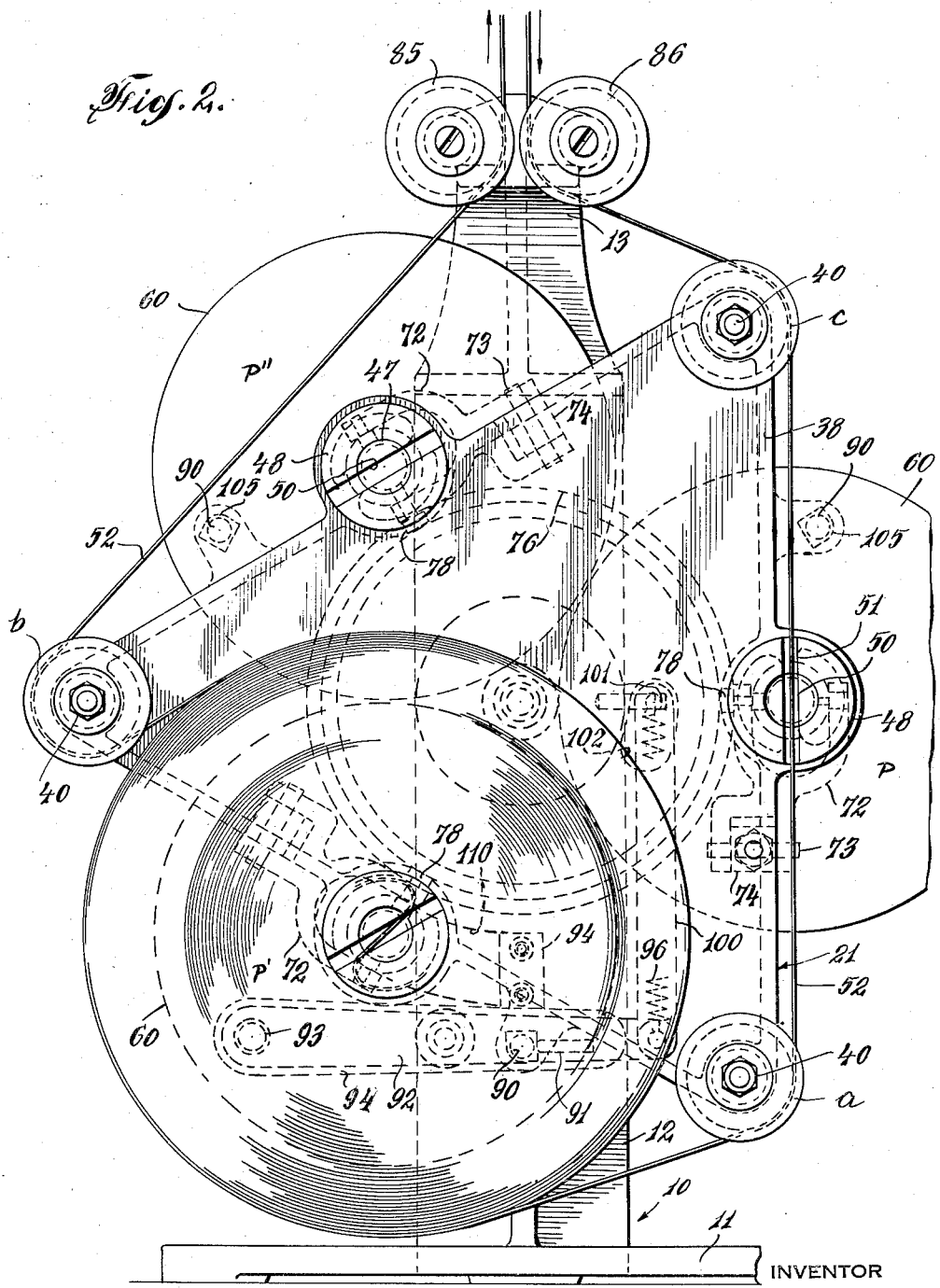

Patented Nov. 6, 1934

1,979,355

UNITED STATES PATENT OFFICE 1,979,355

WINDING MECHANISM

Irving L. Tenney, New York, N. Y.

Application February 1, 1932, Serial No. 590,183

31 Claims. (Cl. 88—18.7)

This invention relates to winding devices such as may be used in conjunction with the recording of sound on flexible material, the subsequent reproduction of the sound and the taking and exhibition of motion pictures or synchronized sound and picture.

In my co-pending application Serial Number 553,558 filed July 28, 1931 I disclose an apparatus by which an endless film, wire or other flexible body may be fed continuously and repeatedly past some point at which the recording or reproduction takes place. In the apparatus disclosed in said application, I provide a plurality of winding and unwinding reels adapted to carry on endless film which looped at the center of the reel and wound on the reel doubled on itself. In the operation of this apparatus one of the reels serves for the time being as a winding reel and the other as an unwinding reel. The reels are carried on a rotatable spider so that one of the reels may be moved into a position formerly occupied by another whenever the transference of the film from one reel to another is completed. The stretches of the film as they pass off from the unwinding reel to be wound on the other are spaced from one another, and one of these stretches moves past the point of recording or reproduction. A complete unwinding of one reel and the winding of the other serves to move approximately one half of the film past this point and when this is accomplished I interchange the positions of the reels and cause the reel which has been winding the film to unwind it and a reel from which the film has been unwound to engage and wind it doubled on itself. During this second step of winding the remainder of the length of film is moved past recording or reproducing point. As the series of operations above described may be repeated, the entire film may be fed past this point continuously and without interruption any desired number of times.

In the specific disclosure of my co-pending application, I provide a plurality of electrical motors one for each of the winding reels or mandrels and I also provide electrical controlling means for the motors whereby the winding and unwinding operations may be performed in proper sequence. The present invention is an improvement on the apparatus of my co-pending application. In accordance with the present invention, I employ one driving motor for all of the winding reels and for the purpose of actuating the various reels in proper succession I provide mechanical coupling means between the motor and reels, which is suitably controlled by the rotary movement of the reel carrying spider. Also to simplify the mechanical drive between the motor and the mandrel shafts, I provide a single belt which drives all of the mandrel shafts from the motor shaft. In the present embodiment of my invention the motor field is rigid with the body of the spider frame so as to prevent an undesirable turning of the spider frame under the effect of the motor torque as will be more fully explained hereafter.

Other features or advantages of the present invention reside in simplicity and economy of construction, ease and efficiency in operation and control and durability in use.

Other objects and advantages of my invention will appear from the following description taken in connection with the accompanying drawings which show one embodiment of my invention and wherein:

Figure 1 is a side elevation of winding apparatus employing three winding mandrels;

Figure 2 is a front elevation of the apparatus viewed from the left of Figure 1;

Figure 3 is a horizontal central sectional view partly an elevation taken on the line 3—3 of Figure 1 and showing the motor and its shaft and the sleeve upon which the motor field is supported and which extends through the supporting frame of the device and is connected at its forward end to the rotary spider;

Figure 4 is a sectional view taken on the same plane as that of Figure 3 but showing the construction at one side of the machine including one of the mandrels, its actuating shaft and the clutch for coupling this shaft to the driving pulley; and Figure 5 is a diagrammatic view showing the single belt drive for the three mandrel shafts.

Referring more particularly to Figures 1 to 3 reference character 10 represents a supporting frame comprising a base 11, an upright portion 12 and an overhanging portion 13. The upright portion 12 is formed intermediate its length with a tubular bearing extension 14 in which is mounted a rotary sleeve 16 which forms a connecting means between the field of the motor 20 and the rotary spider 21 which carries the winding mandrels.

The field of the motor 20 has secured thereto a cup plate 22 having a forwardly extending tubular portion 23 which is secured to the sleeve 16 in any suitable manner as by a screw 24. Surrounding the tubular portion 23 is an insulating collar 26 formed with annular grooves in which conducting rings 27 are secured, each of these rings being connected to a conductor 30 for supplying current to the motor. Current may be supplied to the slip rings by means of brushes 33 held in any suitable manner as by a bracket 34 fastened to the frame 10. The forward end of the sleeve 16 is rigidly secured in a bushing 36 formed at the center of the rear member 37 of the spider 21. The rear member 37 and the front member 38 of the spider are both triangular in form as shown in Figure 2 and are rigidly connected to one another at their corners by bolts 40 at the forward ends of which are mounted in ball bearings the film guide rollers designated respectively a, b and c.

The armature shaft 42 extends outwardly through the sleeve 16 and has secured to its outer end the pulley 43 which has a shaft journaled at the center of the front member 38 of the spider 21.

Journaled mid-way of the sides of the triangular spider 21 are mandrel assemblies comprising mandrel carrying shafts 44 each formed with an enlarged portion 45 seated in a bearing 46 in the member 38 and also formed with a somewhat reduced forwardly extending portion 47 to which is secured the removable mandrel or mandrel head 48. As will be seen from Figures 2 and 4 the extension 47 is slotted transversely at 50 and the mandrel head is correspondingly slotted at 51, the slots 50 and 51 being in alignment to permit the entrance therein of the film 52. The mandrel head 48 is secured to the extension 47 by a screw or other appropriate means 53 and in practice the extension 47 is preferably formed with a longitudinal groove adapted to receive a rib on the inner surface of the head 48 so as to insure an alignment of the slots 50 and 51 when the two are assembled. The mandrel head 48 is formed with an outwardly extending guide flange 55, back of which, the surface which carries the film is curved as indicated in Figure 2 so as to support the film without danger of creasing or cracking it as is more fully explained in my co-pending application.

The bearing member 46 extends rearwardly as indicated at 59 and mounted thereon so as to turn freely is a large pulley 60 which serves to transmit motion to the mandrel 48. Each of the pulleys 60 is adapted to be turned from the central pulley 43 by means of a continuous belt 67 which engages the pulley 43 and each of the pulleys 60 in such a manner as to rotate them in a clockwise direction as shown in Figure 5. Suitably secured to or formed integral with the rear face of the pulley 60 is a clutch member 61 formed with openings 62 adapted to receive the pins 63 mounted on a counter part clutch member 64 carried by a sleeve 65 adapted to slide back and forth on the mandrel shaft 44. Clutch member 64 is adapted to turn the shaft 44 through the medium of a pin 66 extending through the shaft 44 and through longitudinal slots 67' in the sleeve 65. The inner end of the sleeve 65 is formed with an annular groove 70 in which are seated at diametrically opposite points, pins or rollers 71 connected to a yoke 72 pivotally mounted at 73 to a bracket 74 secured to the rear member 37 of the spider 21.

The function of the motor is to wind the film as it is delivered to the winding device from the projector or reproducer. As it is intended merely to take up slack of the film the power of the motor may be but a small fraction of a horsepower.

By reference to Figure 4 it will be seen that rotation of the pulley 43 from the motor 20 will, through the medium of the belt 67, turn the pulley 60 and this through the clutch members 61 and 64, sleeve 67 and pin 66 will turn the shaft 44 and the mandrel carried at its outer end. When the yoke 72 is moved in a direction toward the right in Figure 1 this will serve to slide the sleeve 61 along the shaft 44 and disengage the pin 63 from the clutch member 61 thus disconnecting the motor from the mandrel.

Yoke 72 which is mounted on and rotates with the spider 21 is adapted to be actuated by a cam 76 carried by the forward end of the bearing member 14. This cam is formed with a cam groove 77 in which rides the roller 78 mounted at inner side of the yoke 72. Cam 76 while mounted on the bearing 14 is adapted to have a slight rotary movement relative thereto for purposes which will be explained hereafter.

In order to advance the shaft and mandrel to permit the mandrel to engage the film 52 for the purpose of winding it thereon, and to retract the shaft when it is desired to release the film from the mandrel, I provide the rear end of the shaft with a collar 80 having a groove 81 in which are seated the rollers 82 of the yoke 83 pivoted at 84 at the rear end of the bracket 74. The yoke 83 at one side carries a roller 85 which rides in a groove 86 in a stationary cam 87 rigidly secured to the tubular bearing extension 14. In the position shown in Figures 1 and 4 the mandrel is advanced, the yoke 83 occupying its left end position. It will be seen that by movement of the yoke 83 toward the right by the cam 81, the shaft 44 and mandrel will be moved toward the left as shown in Figures 1 and 4 and the mandrel will assume its retracted position.

It will, of course, be understood from Figure 2 that there are three yokes 72 and three clutches 61, 64, one for each of the mandrel shafts 44 and all of the yokes 72 are actuated by the single central cam 76. Likewise there are three yokes 83 one for each of the shafts 44 all three being operated in proper sequence by the single cam 81.

By reference to Figure 2 it will be seen that the film 52 after passing over the guide roller b passes under a guide roller 85 mounted on the overhanging portion 13 of the frame 10 and thence upwardly to the recording or reproducing apparatus (not shown). From this apparatus the film returns under a guide roller 86 and thence to the spider over the guide roller c. When the film is a motion picture film and is used with motion picture projectors of present types, one stretch of the film may be carried upward over a curved roller guide or through a smooth metal channel guide to a position upon the projector and thence through the projector and along a relatively straight guide to the spider.

In Figure 2 the three mandrels occupy positions designated respectively as P, P' and P''. The mandrel occupying the position P is about to start winding the film, the film as will be seen from this figure, extending in a straight line from pulley c to pulley a through the slot of the mandrel.

Just prior to the time at which the parts assume the respective positions shown in Figure 2, the spider has rotated in a clockwise direction and during this rotation the mandrel occupying position P'' (which was formerly in position P') has been moved to its retracted position, thus releasing the film which has been entirely unwound from this mandrel. The mandrel which in Figure 2 occupies the position P has during its movement to this position been advanced so that the two halves of the mandrel embrace the film as shown, for example, in Figure 4.

The mandrel occupying position P' it will be seen is fully wound. This mandrel having just been moved from position P which is the winding position. At substantially the instant at which two of the mandrels, respectively reach positions P and P', the clutch on the shaft of the mandrel at position P is moved to couple the mandrel to the motor drive and at this instant, the clutch on the shaft of the mandrel occupying the position P' has been moved to uncouple its mandrel from the motor drive. Thus the mandrel occupying position P ready to wind the film while the mandrel occupying position P' is free to unwind the film.

In order to provide for the actuation of these clutches at the proper instant, I provide means whereby the cam 76 which controls the clutches is rotated slightly at the instant the mandrels occupy the positions shown in Figure 2. To accomplish this I provide the rear member 37 of the spider 21 with three rearwardly projecting pins 90 shown in Figures 1 and 2. These pins as they rotate with the spider are adapted to engage successively the top of a shelf 91 which projects forwardly from an arm 92 which is pivoted at one end at 93 to a horizontal bar or block 94 rigidly secured to the upright portion 12 of the frame 10. Arm 92 is normally biased to raised position by a spring 96 secured at one end to the free end of the arm 92 and at its opposite end to the upright portion of the frame. The free end of the arm 92 is connected by a vertical link 100 to a pin 101 which extends through an arcuate slot 102 in the cam 81 and is rigidly connected to the cam 76 at a point some distance from the axis of the cam as is shown in Figure 2.

The pin 90 is formed with a curved outer surface 105 and when by rotation of the spider by the pull of the film 52 after the mandrel occupying the position P has become entirely unwound, the pin engages the upper face of the shelf 91. This depresses the arm 92 against the action of the spring 96, which results in rotating the cam 76 in a clockwise direction as viewed in Figure 2 so that for a short interval of time both the spider and the cam 76 rotate together. This motion of the cam 76 continues until the pin 90 moves off the shelf 91 when the arm 92 acting under the influence of the spring 96 moves upwardly and the link 100 and pin 101 serve to rotate the cam 76 quickly in a counter-clockwise direction thereby operating the clutch of the mandrel occupying position P to couple this mandrel to the motor drive and operating the clutch of the mandrel occupying the position P' to uncouple the latter mandrel from the motor drive. The mandrel shown in Figure 1 is occupying the position P and it will be seen from the position of the slot 77 of the cam 76 that the yoke 72 has just been moved toward its left hand position thereby operating clutch 61, 64 and coupling the pulley 60 to the mandrel shaft. During this motion of the cam 76 the clutch controlling the mandrel occupying the position P' is disconnected as previously stated.

During movement of the mandrel from position P to position P' by reason of the rotation of the spider 21 the motor remains coupled to the mandrel although during this time the motor, that is its field and armature, are rotated as a unit, with the spider, the torque between the field and armature maintaining the film taut.

When a mandrel approaches the position P' the rear end of the mandrel shaft shown at 108 in Figure 4 comes into contact with the free end of a leaf spring 110 which is rigidly secured by bolts 106 to the stationary block 94. The pressure of this spring against the end of the mandrel shaft provides sufficient friction to prevent a too rapid unwinding, or slackening of the film as it is unwound, from the mandrel occupying position P'. The motor in winding the mandrel occupying position P will in general tend to cause a counter-clockwise rotation of the spider. This counter-clockwise rotation is however prevented by engagement of the pins 90 with the end of the shelf 91. It will be seen from Figure 5 of the drawings that were the field of the motor rigidly connected with some stationary support such as the frame 10 rotation of the driving pulley would tend to cause the spider to rotate in a clockwise direction. However, with the field connected with the spider the tendency of the field to rotate the spider in a counter-clockwise direction offsets the tendency of the spider to rotate it in a counter-clockwise direction.

By reference to Figures 1 and 4 it will be seen that the pin 66 projects outwardly beyond the slots 67 and upon retraction of the mandrel enters the V-shaped recesses 112 in the bearing bushing 111, thus maintaining the slots in the mandrel in proper position for reception of the film when the mandrel is advanced.

While in the present disclosure, I have illustrated the various bearings as of the sliding friction type it is obvious that ball bearings may be employed instead, thus rendering the mandrels and spiders easily turnable.

Having now described my invention, what I claim and desire to secure by Letters Patent is:

1. In a winding device for a continuous film, a rotary frame, two opposed winding reels mounted on said frame and adapted for winding the film doubled on itself, means for attaching the film to the reels for winding and for releasing the film from the reels after unwinding, guiding means separating the two parts of the doubled film as it is unwound from a reel, a motor for operating the reels, controlling means comprising two clutches between the motor and the respective reels, each clutch comprising two co-operating clutching members mounted on and movable with said frame for causing alternate winding and unwinding of the reels in succession and means for rotating the frame between successive winding operations.

2. In a winding device for a continuous film, a rotary frame, a motor having an armature, a field movable with said frame, a plurality of winding reels mounted on said frame, operating connections between the motor and armature, means comprising a common belt drive for said reels and clutches between said drive and the respective reels and means controlled by the rotation of said frame for operating said clutches.

3. In a winding device for a continuous film, a plurality of rotary shafts, slotted mandrels of substantially cylindrical contour interrupted by relative narrow film receiving spaces extended inwardly from one end of the mandrel, said mandrels being removably secured to the shafts, a motor for rotating said shafts, means for transposing the mandrels, means for advancing the mandrels into holding engagement with the film, means for retracting the mandrels to disengage said film and means for positioning the slots and film to permit entrance of the film into a slot on advance of the mandrel.

4. In a winding device for a continuous film, a supporting frame having a bearing, a spider rotatably mounted on said frame, film winding reels mounted on said spider, a motor comprising a field and armature, a sleeve secured to said field and spider, and rotatably mounted in said bearing, a shaft extending through said sleeve and connected to the armature, a pulley on said shaft, reel driving pulleys, clutches connecting said last named pulleys to said reels and a common belt connecting said pulleys.

5. In a winding device for a continuous film, a supporting frame having a bearing, a spider rotatably mounted on said frame, film winding reels mounted on said spider, a motor comprising a field and armature, a sleeve secured to said field and spider and rotatably mounted in said bearing, a shaft extending through said sleeve and connected to the armature, a pulley on said shaft, reel driving pulleys, clutches connecting said last named pulleys to said reels, a common belt connecting said pulleys, means for rotating said spider and means controlled by the rotation of said spider for operating said clutches.

6. In a device of the character described, a supporting frame, a spider rotatably mounted on said frame, winding reels rotatably mounted on said spider, driving means for said reels, a clutch carried by said spider interposed between said driving means and each reel, a cam mounted on said frame, cam engaging members mounted on said spider, operating connections between said members and clutches, means controlled by the rotation of said spider for moving said cam to operate said clutches when said spider has rotated to a predetermined position and means for attaching an endless film to the reels for winding and releasing the endless film from the reels after unwinding.

7. In a device of the character described, a supporting frame, a spider rotatably mounted on said frame, winding reels rotatably mounted on said spider, driving means for said reels, clutches interposed between said driving means and the reels, a cam mounted on said frame, cam engaging members mounted on said spider, operating connections between said members and clutches, and means controlled by the rotation of said spider for moving said cam to operate said clutches when said spider has rotated to a predetermined position, a second cam mounted on said frame and means operated by said second cam for moving said reels along their axes of rotation.

8. In a device of the character described, a supporting frame, a spider rotatably mounted on said frame, winding reels on said spider, driving means for said reels, separate clutches for connecting respective reels to said driving means, means for operating said clutches, comprising a cam rotatably mounted on said frame, connections between said cam and clutches, an arm pivoted to said frame and adapted to occupy two positions, a spring biasing the arm to one of said positions, connections between the cam and arm for rotating the cam and a projection on said spider adapted to engage said arm on rotation of said spider to rotate said cam in one direction and to disengage said arm to permit said spring to rotate said cam in the opposite direction.

9. In a winding device for a continuous film, a supporting frame having a bearing, a spider rotatably mounted on said frame, film winding reels mounted on said spider, a motor comprising a field and armature, a sleeve secured to said field and spider and rotatably mounted in said bearing, a shaft extending through said sleeve and connected to the armature, a pulley on said shaft, reel driving pulleys, clutches connecting said last named pulleys to said reels, a common belt connecting said pulleys, means for rotating said spider and means comprising a cam mounted on said frame for controlling the operation of said clutches in response to the rotation of said spider.

10. In a winding device for a continuous film, a supporting frame having a bearing, a spider rotatably mounted on said frame, film winding reels mounted on said spider, a motor comprising a field and armature, a sleeve secured to said field and spider and rotatably mounted in said bearing, a shaft extending through said sleeve and connected to the armature, a pulley on said shaft, reel driving pulleys, clutches connecting said last named pulleys to said reels, a common belt connecting said pulleys, means for rotating said spider, means comprising a cam mounted on said frame for controlling the operation of said clutches in response to the rotation of said spider and means comprising a cam on said frame for reciprocating said reels to engage and disengage said film, in response to rotation of said spider.

11. In a winding device for continuous film, a plurality of rotary shafts, winding mandrels having relatively narrow film holding slots, removably secured to the shafts, means for rotating said shafts, means for transposing the positions of the mandrels, guiding means for preserving the position of the film with respect to the mandrels on transposition, means for advancing the mandrels into holding engagement with the film, means for retracting the mandrels to disengage the film and means for positioning the mandrels during transposition so that on advance the slot in the mandrel will embrace the film.

12. In a winding device for a continuous film, a rotary support, winding reels eccentrically mounted thereon and adapted for winding the film doubled on itself, pulleys connected to the respective reels, means for attaching the film to the reels for winding and for releasing the film from the reels after unwinding, a driving means for said reels comprising a motor for operating said reels, a driving shaft located centrally of said support, a common belt drive extending over the respective pulleys for transmitting power from said shaft to the several reels and clutches for the several reels for successively connecting the reels with said driving means.

13. In a winding device for a continuous film, a rotary support, winding reels eccentrically mounted thereon and adapted for winding the film doubled on itself, pulleys connected to the respective reels, means for attaching the film to the reels for winding and for releasing the film from the reels after unwinding, a driving means for said reels comprising a motor for operating said reels, a driving shaft located centrally of said support, a common belt drive extending over the respective pulleys for transmitting power from said shaft to the several reels, clutches for alternately connecting the several reels successively with said driving means and means for rotating said support to transpose the position of said reels.

14. In a winding device for a continuous film, a rotary support, winding reel assemblies eccentrically mounted thereon and comprising reels adapted for winding the film doubled on itself, means for attaching the film to the reels for winding and for releasing the film from the reels after unwinding, a driving means for said reels comprising a motor for operating said reels, a driving shaft located centrally of said support, a common belt drive extending from the shaft to the several reel assemblies for transmitting power from said shaft to several reels, clutches for alternately connecting the several reels successively with said driving means and means whereby the pull of said film rotates said support to transpose said reels.

15. A mandrel for winding film or the like, comprising a shaft slotted at one end, and a cylindrical mandrel head surrounding and removably secured to said shaft, said head having opposite openings in alignment with said slot, one side of each of said openings being gradually curved to merge with the outer cylindrical surface of said head.

16. In apparatus of the class described, a device for utilizing a continuous band of film, said device comprising feeding means for passing the film therethrough, a winding device comprising a rotary support, winding reels eccentrically mounted thereon and adapted for winding the film doubled on itself, means for attaching the film to a reel for winding the same from another reel and from said feeding means, and for releasing the film from a reel after unwinding, means for rotating said support for transposing the positions of said reels when one reel is unwound, reel driving means of relatively small power for winding the film, means connecting said driving means with a reel while in the winding position and maintaining said connection until said last named reel reaches the unwinding position and for disconnecting said reel driving means from the reel while in unwinding position and maintaining such reel disconnected until it has assumed the winding position.

17. In apparatus of the class described, a device for utilizing a continuous band of film, said device comprising feeding means for passing the film therethrough, a winding device comprising a rotary support, winding reels eccentrically mounted thereon and adapted for winding the film doubled on itself, means for attaching the film to a reel for winding the same from another reel and from said feeding means, and for releasing the film from a reel after unwinding, means for rotating said support for transposing the positions of said reels when one reel is unwound, reel driving means of relatively small power for winding the film, a clutch between each reel and reel driving means, means for operating said clutches quickly to connect said driving means with the winding reel as it assumes winding position and maintaining said connection until said last named reel reaches unwinding position and quickly to disconnect said reel driving means from said reel as it assumes unwinding position and maintaining said reel disconnected until it has assumed winding position.

18. In apparatus of the class described, a device for utilizing a continuous band of film, said device comprising a rotary support, winding reels eccentrically mounted thereon and adapted for winding the film doubled on itself, means for attaching the films to the reels for winding the same from another reel and from said feeding means and for releasing the film from a reel after unwinding, means for rotating said support for transposing the positions of said reels when one reel is unwound, reel driving means of relatively small power for winding the film, a clutch between each reel and reel driving means, means for quickly operating said clutches to connect said driving means with the winding reel as it assumes winding position and maintaining said connection until said last named reel reaches unwinding position and for disconnecting said reel driving means from said reel while in unwinding position and maintaining said reel disconnected until it has assumed winding position, whereby the pull on said film rotates said support in one direction to transpose the positions of said reels and a stop for preventing reverse rotation of said support.

19. In a winding device for a continuous film, film feeding means, a support, two opposed winding reels mounted on said support and adapted for winding the film doubled on itself, means for attaching the film to the reels for winding and for releasing the film from the reels after unwinding, a motor for operating the reel, means for coupling the motor alternately to the reels for winding and for uncoupling the motor from the reels during unwinding, said support being freely rotatable in one direction through the pull of said film by said feeding means, means whereby the positions of said reel are transposed for winding onto and unwinding from a reel, a guide for the film so positioned with respect to the winding reel that the tension of the film during winding tends to rotate said support in the opposite direction and a stop for preventing rotation of said support in said opposite direction.

20. In a winding device for a continuous film, a rotatable support, a plurality of mandrels carried by said support, means causing the mandrels to engage the film for winding and disengage the film after it has been unwound therefrom, said support being freely rotatable under the pull of said film to interchange the positions of said mandrels, a source of power for turning said mandrels to wind the film and to maintain the film taut as said support rotates, said source of power through its connection with said mandrels tending to turn said support in one direction and means for applying to said support while turning a force tending to turn said support in the opposite direction, whereby said support is free to turn under relatively slight pull of said film.

21. In a winding device for a continuous film, a rotatable support, a plurality of mandrels carried by said support, means causing the mandrels to engage the film for winding and disengage the film after it has been unwound therefrom, said support being freely rotatable under the pull of said film to interchange the positions of said mandrels, a source of power for turning said mandrels to wind the film and to maintain the film taut as said support rotates, said source of power through its connection with said mandrels tending to turn said support in one direction and connections between said source and support for applying to said support while turning a force tending to turn said support in the opposite direction, whereby said support is free to turn under relatively slight pull of said film.

22. In a winding device for continuous film, a rotatable support, a plurality of mandrels carried by said support, means causing a mandrel to engage the film for winding and disengage the film after unwinding, said support being freely rotatable under the pull of said film for transposing the positions of said mandrels, a motor for turning the mandrels for winding the film, operating connections between said motor and the respective mandrels, said connections including clutches for coupling said mandrels to said motor in succession for winding and operative to uncouple a mandrel only after said mandrel has left said winding position, whereby the film is maintained taut while said frame is rotated.

23. In a device for winding a continuous film, a rotary frame, a plurality of mandrel assemblies, each comprising a film engaging part, a rotary shaft for turning said part to wind the film, means for advancing the part to engage the film for winding and retracting said part to disengage the film after unwinding, a motor for operating said assemblies to wind the film, clutches for connecting each shaft with said motor for turning the shaft, each clutch comprising two cooperative clutch members mounted on and movable with the frame and controlling means for operating the clutches successively to connect and disconnect the motor from a shaft.

24. In a device for winding a continuous film, a rotary frame, a plurality of mandrel assemblies, each comprising a film engaging part, a rotary shaft for turning said part to wind the film, means for advancing the part to engage the film for winding and retracting said part to disengage the film after unwinding, a motor for operating said assemblies to wind the film, clutches for connecting each shaft with said motor for turning the shaft, each clutch comprising two cooperative clutch members mounted on and movable with the frame and cam means for operating the clutches successively to connect and disconnect the motor from a shaft.

25. In a device for winding a continuous film, a rotary frame, a plurality of mandrel assemblies, each comprising a film engaging part, a rotary shaft for turning said part to wind the film, means for advancing the part to engage the film for winding and retracting said part to disengage the film after unwinding, guiding means for said film and guiding means for said shaft mounted on and movable with said frame and operative to position said part relative to said film that on advance to said part, it will engage said film for winding without injury to said film, a motor for operating said assemblies to wind the film, clutches for connecting each shaft with said motor for turning the shaft, each clutch comprising two cooperative clutch members mounted on and movable with the frame and controlling means for operating the clutches successively to connect and disconnect the motor from a shaft.

26. In a device for winding a continuous film, a rotary support, a plurality of mandrel assemblies carried by said support, each assembly comprising a mandrel of substantially cylindrical contour and having a space extending inwardly from one end which affords a straight line path for said film through the mandrel, the two opposite walls of said space meeting the outside of said mandrel in a gradual curve and each assembly comprising a reciprocating part adapted to be advanced to cause the mandrel to embrace the film for winding and to be retracted to disengage the film after unwinding, a motor for turning said mandrels to wind the film, operating connections for causing said motor to turn said mandrel in succession, operating connections for reciprocating said parts to engage and disengage the film, means for rotating said support to interchange the positions of said mandrels and guiding means for said mandrels and for said film adapted to so position the mandrel with respect to the film that on advance said mandrel will embrace the film without injury thereto.

27. In a device for winding a continuous film, a rotary support, a plurality of mandrel assemblies carried by said support, each assembly comprising a mandrel of substantially cylindrical contour and having a space extending inwardly from one end which affords a straight line path for said film through the mandrel, the two opposite walls of said space meeting the outside of said mandrel in a gradual curve and each assembly comprising a reciprocating part adapted to be advanced to cause the mandrel to embrace the film for winding and to be retracted to disengage the film after unwinding, a motor for turning said mandrels to wind the film, operating connections for causing said motor to turn said mandrel in succession, operating connections for reciprocating said parts to engage and disengage the film, means for rotating said support to interchange the positions of said mandrels and guiding means for said mandrels and for said film adapted to so position the mandrel with respect to the film that on advance said mandrel will embrace the film without injury thereto, said guiding means for the mandrel being located on and movable with said support.

28. A winding device for a continuous film, comprising a support mounted to rotate on a pivotal axis, a plurality of winding mandrels carried by said support, operating means for causing a mandrel to engage the film for winding and to disengage the film after unwinding, means for moving the support to transpose the positions of the mandrels and means for turning the mandrels to wind film thereon, said means including a motor, a shaft connected with said motor and mounted concentric with the axis of rotation of said support and operating means connecting said shaft and mandrels.

29. A winding device for a continuous film, comprising a support mounted to rotate on a pivotal axis, a plurality of winding mandrels carried by said support, operating means for causing a mandrel to engage the film for winding and to disengage the film after unwinding, means for moving the support to transpose the positions of the mandrels and means for turning the mandrels to wind film thereon, said means including a motor, a shaft connected with said motor and mounted concentric with the axis of rotation of said support and a common operating connection between said shaft and mandrels.

30. A winding device for a continuous film, comprising a support mounted to rotate on a pivotal axis, a plurality of winding mandrels carried by said support, operating means for causing a mandrel to engage the film for winding and to disengage the film after unwinding, means for moving the support to transpose the positions of the mandrels and means for turning the mandrels to wind film thereon, said means including a motor, a shaft connected with said motor and mounted concentric with the axis of rotation of said support and a belt connecting said shaft and mandrels.

31. A winding device for a continuous film, comprising a support mounted to rotate on a pivotal axis, a plurality of winding mandrels carried by said support, operating means for causing a mandrel to engage the film for winding and to disengage the film after unwinding, means for moving the support to transpose the positions of the mandrels and means for turning the mandrels to wind film thereon, said means including a motor mounted on and movable with said support and operating connections between said motor and mandrels.

IRVING L. TENNEY.